Patented Oct. 24, 1939

2,177,548

UNITED STATES PATENT OFFICE 2,177,548

ACCELERATOR OF VULCANIZATION

Paul C. Jones, Akron, Ohio, assignor to The B. F. Goodrich Company, New York, N. Y., a corporation of New York No Drawing. Application July 28, 1937, Serial No. 156,173

21 Claims. (Cl. 260—788)

This invention relates to the art of rubber manufacture and has as its chief object to provide a new class of accelerators. Another object is to provide a process of vulcanizing rubber in the presence of a material whereby high tensile strength, increased elongation, and other desirable properties will be attained in the resulting rubber product.

I have discovered that compounds having the structural formula

$$(R-S-A)_3N$$

wherein R is an organic radical with the free valence on a carbon atom and A is an alkylene group are excellent accelerators. Since all of these compounds may be derived from a sulfhydryl (R—SH) compound, they will be grouped according to the sulfhydryls to which they are related.

Accelerators which may be derived from the hydrocarbon mercaptans include such compounds as tris(methylmercaptomethyl) amine, tris(ethylmercaptoethyl) amine, tris(isopropylmercaptomethyl) amine, tris(allylmercaptomethyl) amine, tris(cyclohexylmercaptoethyl) amine, tris(phenylmercaptomethyl) amine, tris(benzylmercaptomethyl) amine, tris(ortho, meta or para tolylmercaptomethyl) amine, tris(alpha or beta naphthylmercaptomethyl) amine, etc.

Other members of this new class of accelerators which may be derived from carbothiolic and carbodithioic acids include tris(methanecarbothionylmercaptomethyl) amine, tris(acetylmercaptomethyl) amine, tris(ethanecarbothionylmercaptoethyl) amine, tris(benzenecarbothionylmercaptomethyl) amine, tris(3-furoylmercaptomethyl) amine, tris(3-furanecarbothionylmercaptomethyl) amine, etc.

Accelerators which may be derived from dithiocarbamic acids include tris(dimethylthiocarbamylmercaptomethyl) amine, tris(diethylthiocarbamylmercaptomethyl) amine, tris(methyl-ethylthiocarbamylmercaptomethyl) amine, tris(ethylthiocarbamylmercaptomethyl) amine, tris(methyl-phenylthiocarbamylmercaptomethyl) amine, tris (dicyclohexylthiocarbamylmercaptomethyl) amine, tris (diphenylthiocarbamylmercaptomethyl) amine, tris(phenyl - betanaphthylthiocarbamylmercaptomethyl) amine, tris (di alpha - naphthylthiocarbamylmercaptomethyl) amine, tris(phenyl-para-xenylthiocarbamylmercaptoethyl) amine, tris(phenyl-p-tolylthiocarbamylmercaptomethyl) amine, tris(p-methyl p'-isopropoxy diphenyl thiocarbamyl mercaptomethyl) amine, tris(o,o' dimethyl methylene diphenyl thiocarbamyl mercaptomethyl)-amine, tris (phenyl-p-isopropenylphenyl thiocarbamyl mercaptomethyl) amine, tris(phenyl-p-chlorphenylthiocarbamylmercaptomethyl) amine, tris(phenyl-p - dimethylaminophenylthiocarbamylmercaptomethyl) amine, tris(phenyl-p-hydroxyphenylthiocarbamylmercaptomethyl) amine, tris (phenyl-anilinophenylthiocarbamylmercapto methyl)-amine, etc.

Accelerators which may be derived from mercaptooxazoles and mercaptothiazoles include tris-(2 - thiazylmercaptomethyl) amine, tris(2-benzothiazylmercaptomethyl) amine, tris(2-naphthothiazylmercaptomethyl) amine, tris(2-benzooxazylmercaptomethyl) amine, tris(4,5 dimethyl 2-thiazylmercaptomethyl) amine, etc.

It is to be understood that these accelerators are claimed regardless of the method by which they are made, but that for convenience they are classified above by means of the sulfhydryls from which they are derived.

The accelerators of this invention may all be prepared by the reaction reported by Dougherty and Taylor, J. A. C. S. 55, 4588 between the desired sulfhydryl compound and a hexaalkylidenetetramine with the elimination of ammonia.

As a specific example of one embodiment of the method of this invention, a rubber composition is prepared by mixing rubber 100 parts by weight, zinc oxide 5 parts, stearic acid 1 part, sulfur 3.5 parts, and tris(diphenylthiocarbamylmercaptomethyl) amine 0.5 part. When this composition is cured for 15 minutes at 240° F., a well-cured product having a tensile strength of over 4000 lbs. per sq. in. and an elongation of over 800 percent is produced. When tris-(phenyl beta-naphthylthiocarbamylmercaptomethyl) amine is substituted in the above recipe, a product having a tensile strength of nearly 5000 lbs. per sq. in. is obtained after curing for 45 minutes at 220° F. Similar excellent results are obtained with tris(2-benzothiazylmercaptomethyl) amine, tris(phenylmercaptomethyl)-amine, or indeed any of the accelerators of this invention.

It is to be understood that the specific examples given above are merely illustrative of one manner of use of the accelerators of this invention; that other accelerators within the scope of the class herein defined may be substituted for the specific compounds used in the examples; that the accelerators of this invention may be used to vulcanize rubber broadly, including caoutchouc, balata, gutta-percha, synthetic rubber, or natural or artificially prepared latex; that the accelerators may be incorporated in the rubber by mastication or milling, or in the case of latex or other dispersion or solution, by simply dissolving or suspending therein; that the accelerators may be used in admixture with each other or other known accelerators, or with antioxidants, organic acids, amines, softeners, activators, pigments, fillers, etc.; and that the rubber may be vulcanized with the assistance of this new class of accelerators in other manners than that particularly set forth above; specifically, it may be vulcanized in heated metal molds, in hot air, steam, hot water, etc. The accelerators of this invention may advantageously be used in as low a proportion as 0.05% of the rubber in the composition, in which case 3 or 4% of sulfur is generally required, or as high as 5%, with a much reduced quantity of the sulfur.

The scope of this invention is accordingly not to be limited to the specific examples herein set forth, but it is to be limited only as required by the prior art and as indicated in the appended claims.

I claim:

1. The process which comprises vulcanizing rubber in the presence of a compound having the structural formula $$(R\!-\!S\!-\!A)_3N$$

wherein R is an organic radical with the free valence on a carbon atom and A is an alkylene group.

2. The process which comprises vulcanizing rubber in the presence of a compound having the structural formula $$(R\!-\!S\!-\!A)_3N$$

wherein R is a hydrocarbon radical with the free valence on a carbon atom and A is an alkylene group.

3. The process which comprises vulcanizing rubber in the presence of a tris(triazylmercaptoalkyl) amine.

4. The process which comprises vulcanizing rubber in the presence of a tris(arylenethiazylmercaptomethyl) amine.

5. The process which comprises vulcanizing rubber in the presence of tris(2-benzothiazylmercaptomethyl) amine.

6. The process which comprises vulcanizing rubber in the presence of a tris(arylmercaptoalkyl) amine.

7. The process which comprises vulcanizing rubber in the presence of tris(phenylmercaptomethyl) amine.

8. The process which comprises vulcanizing rubber in the presence of a tris(thiocarbamylmercaptoalkyl) amine.

9. The process which comprises vulcanizing rubber in the presence of a tris(diarylthiocarbamylmercaptomethyl) amine.

10. The process which comprises vulcanizing rubber in the presence of tris(diphenylthiocarbamylmercaptomethyl) amine.

11. The process which comprises heating a mixture of rubber, sulfur, and a compound having the structural formula $$(R\!-\!S\!-\!A)_3N$$

wherein R is an organic radical with the free valence on a carbon atom and A is an alkylene group.

12. A rubber composition which has been vulcanized in the presence of a compound having the structural formula $$(R\!-\!S\!-\!A)_3N$$

wherein R is an organic radical with the free valence on a carbon atom and A is an alkylene group.

13. A rubber composition which has been vulcanized in the presence of a compound having the structural formula $$(R\!-\!S\!-\!A)_3N$$

wherein R is a hydrocarbon radical with the free valence on a carbon atom and A is an alkylene group.

14. A rubber composition which has been vulcanized in the presence of a tris(thiazylmercaptoalkyl) amine.

15. A rubber composition which has been vulcanized in the presence of tris(2-benzothiazylmercaptomethyl) amine.

16. A rubber composition which has been vulcanized in the presence of a tris(arylmercaptoalkyl) amine.

17. A rubber composition which has been vulcanized in the presence of tris(phenylmercaptomethyl) amine.

18. A rubber composition which has been vulcanized in the presence of a tris(thiocarbamylmercaptoalkyl) amine.

19. A rubber composition which has been vulcanized in the presence of tris(diarylthiocarbamylmercaptomethyl) amine.

20. A rubber composition which has been vulcanized in the presence of tris(diphenylthiocarbamylmercaptomethyl) amine.

21. The process which comprises vulcanizing rubber in the presence of a compound having the structural formula $$(R\!-\!S\!-\!CH_2)_3N$$

wherein R is an organic radical with the free valence on a carbon atom.

PAUL C. JONES.

CERTIFICATE OF CORRECTION.

Patent No. 2,177,548.  October 24, 1939.

PAUL C. JONES.

It is hereby certified that error appears in the printed specification of the above numbered patent requiring correction as follows: Page 2, first column, line 41-42. claim 3, for "(triazylmercaptoalkyl)" read (thiazylmercaptoalkyl); and that the said Letters Patent should be read with this correction therein that the same may conform to the record of the case in the Patent Office.

Signed and sealed this 16th day of January, A. D. 1940.

(Seal)

Henry Van Arsdale,
Acting Commissioner of Patents.